1,435,551

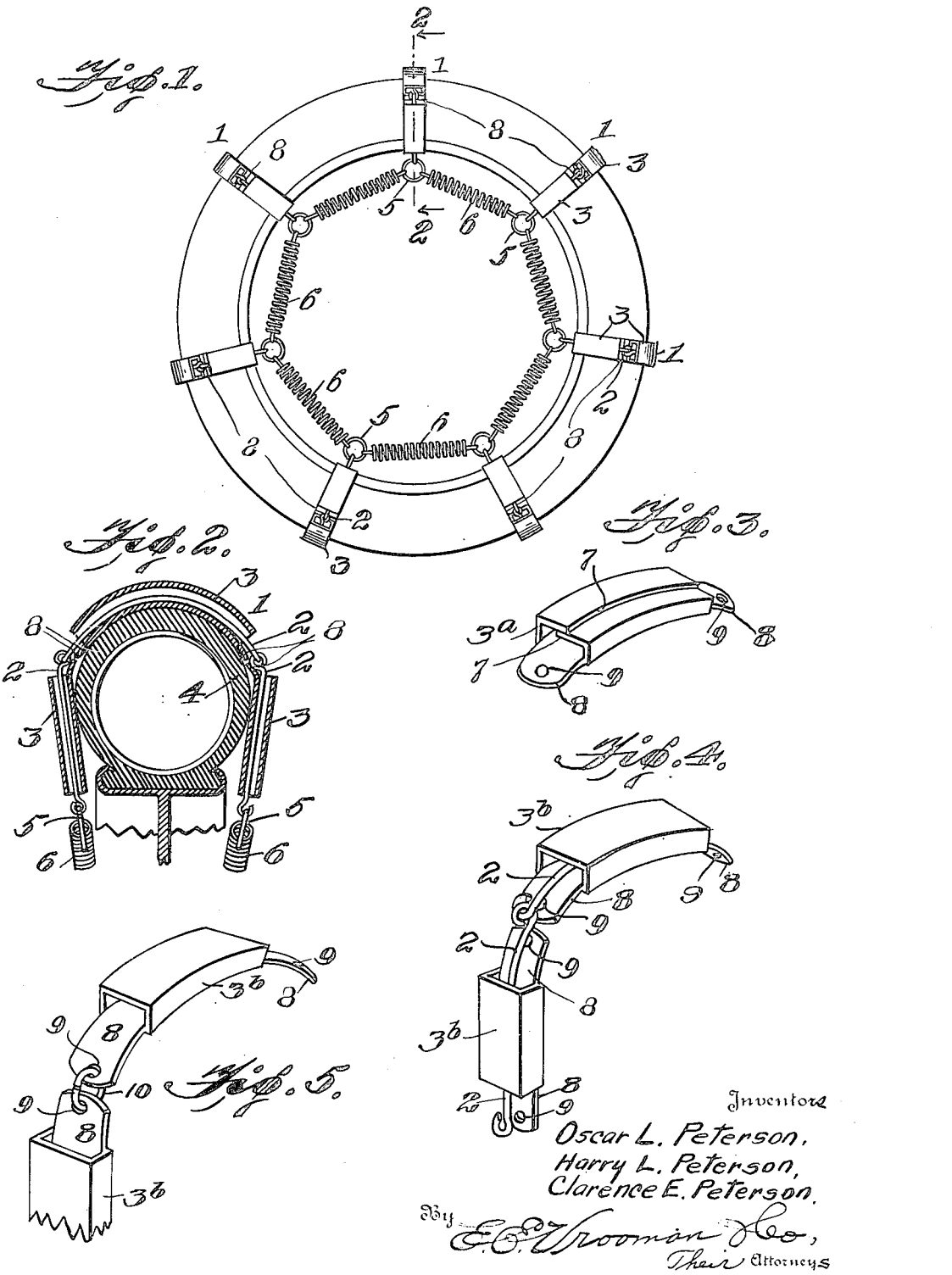
O. L., H. L., AND C. E. PETERSON.
ANTISKID DEVICE FOR AUTOMOBILE TIRES.
APPLICATION FILED FEB. 11, 1922.
1,435,551. Patented Nov. 14, 1922.
Inventors
Oscar L. Peterson,
Harry L. Peterson,
Clarence E. Peterson,
Their Attorneys Patented Nov. 14, 1922.

UNITED STATES PATENT OFFICE.

OSCAR L. PETERSON, HARRY L. PETERSON, AND CLARENCE E. PETERSON, OF NORWICH, CONNECTICUT.

ANTISKID DEVICE FOR AUTOMOBILE TIRES.

Application filed February 11, 1922. Serial No. 535,839.

*To all whom it may concern:*

Be it known that we, OSCAR L. PETERSON, HARRY L. PETERSON, and CLARENCE E. PETERSON, citizens of the United States, residing at Norwich, in the county of New London and State of Connecticut, have invented certain new and useful Improvements in Antiskid Devices for Automobile Tires, of which the following is a specification, reference being had therein to the accompanying drawings.

This invention relates to an anti-skid device for automobile tires, and the object of our invention is the construction of simple and efficient cross elements in an anti-skid device or anti-skid chain.

Another object of the invention is the construction of novel and efficient casings covering the links of the cross chains of an anti-skid device or anti-skid chain.

With these and other objects in view, our invention comprises certain novel combinations, constructions and arrangements of parts as will be hereinafter described, illustrated in the accompanying drawings, and more particularly pointed out in the appended claims.

In the drawings:

Figure 1 is a view, in side elevation, of an anti-skid device or an anti-skid chain on a pneumatic tire, constructed in accordance with the present invention.

Figure 2 is a sectional view, taken on line 2—2, Fig. 1, and looking in the direction of the arrows.

Figure 3 is a perspective view of a split form of a casing.

Figure 4 is an enlarged perspective view of two of the casings with connected links therein.

Figure 5 is a fragmentary, perspective view of the casings, with the connected links removed, and an emergency split ring in place on two contiguous tongues.

Referring to the drawings by numerals, 1 designates the cross elements of our anti-skid device or anti-skid chain. Each cross element comprises flat chain links 2, and upon each link is mounted a hollow flat casing 3. Each casing 3 is preferably rectangular-shaped in cross section. Each casing 3 fits against the tire 4 and affords an excellent gripping surface to grip against ice, snow, or mud, to prevent slipping or skidding of a tire upon which our device is positioned. On the outer ends of the outer links 2, of each cross element 1, are fastened rings 5. Rings 5 connect coil springs 6.

The central flat casing 3 of each cross element 1, is preferably slightly curved to conform to the contour of the outer face of tire 4 so as to give a better grip, and a more firm bearing upon the tire.

In Figure 3 we have shown a split casing $3^a$; the edges 7 of this split casing being overlapped, and the outer edge affords a roughened face to efficiently grip or "bite" against the surface (such as snow, ice, or mud) over which the motor vehicle may be passing.

In Figures 4 and 5 we have shown casing $3^b$ that is provided, at its ends, with projecting tongues 8; each tongue is apertured as at 9, and by reason of these apertured tongues, if the links 2 of the cross elements break, all that the operator has to do is to take out of his pocket a split (repair) ring 10 (Fig. 5) and quickly place it in the contiguous apertures 9, connecting the tongues of casings $3^b$, and then proceed on his journey in the motor vehicle upon the tires of which are mounted anti-skid devices constructed in accordance with the present invention. It will be noted that by reason of our tongued structure of casings, mounted upon links of a cross chain or cross element, that we have made a cross element doubly efficient for in the event of the cross chains breaking, the operator can quickly repair the device, by the use of the split rings 10 (Fig. 5) without the liability of the whole anti-skid device being injured or totally destroyed, since it is a known fact that when one of the cross elements of an anti-skid chain becomes broken, it is liable to catch in something on the wheel or on the brake band of the motor vehicle and tear off the entire chain; further, the breaking and non-repair of one of the cross elements will cause a decided slackening of the connecting springs 6 so that it is important, in many instances, to have a temporary "repair" structure such as is shown in Fig. 5.

It is to be noted that if any of the casings become worn or destroyed, it is a simple matter to place a new casing on the device, without discarding the whole device; therefore, we have provided a simple and efficient device that can be readily repaired, increasing the life thereof, and reducing the cost of maintenance.

While we have described the preferred embodiment of our invention, and have illustrated the same in the accompanying drawings, certain minor changes or alterations may appear to one skilled in the art to which this invention relates, during the extensive manufacture of the same and we, therefore, reserve the right to make such alterations or changes as shall fairly fall within the scope of the appended claims.

What we claim is:

1. In a device of the class described, the combination of a plurality of cross elements, each cross element comprising connected links, casings provided with apertured tongues mounted upon said links, and means connecting all of the cross elements together.

2. In a device of the class described, the combination of a plurality of cross elements, each cross element comprising a plurality of pivotally connected links, a casing on each link provided with integral tongues projecting from its ends, said tongues provided at their outer ends with transverse apertures, and means connecting all of the cross elements together.

In testimony whereof we hereunto affix our signatures.

OSCAR L. PETERSON.
HARRY L. PETERSON.
CLARENCE E. PETERSON.